United States Patent
Satake et al.

(10) Patent No.: US 10,684,256 B2
(45) Date of Patent: Jun. 16, 2020

(54) ANALYSIS DEVICE PROVIDED WITH ION MOBILITY SEPARATION PART

(71) Applicant: Hitachi High-Technologies Corporation, Minato-ku, Tokyo (JP)

(72) Inventors: Hiroyuki Satake, Tokyo (JP); Kazushige Nishimura, Tokyo (JP); Hideki Hasegawa, Tokyo (JP); Masuyuki Sugiyama, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 16/078,286

(22) PCT Filed: Feb. 28, 2017

(86) PCT No.: PCT/JP2017/007699
§ 371 (c)(1),
(2) Date: Aug. 21, 2018

(87) PCT Pub. No.: WO2017/150505
PCT Pub. Date: Sep. 8, 2017

(65) Prior Publication Data
US 2019/0079051 A1    Mar. 14, 2019

(30) Foreign Application Priority Data
Mar. 4, 2016    (JP) .................................. 2016-042487

(51) Int. Cl.
*G01N 27/00* (2006.01)
*G01N 27/62* (2006.01)
(Continued)

(52) U.S. Cl.
CPC ......... *G01N 27/624* (2013.01); *G01N 27/622* (2013.01); *H01J 49/004* (2013.01); *H01J 49/068* (2013.01); *H01J 49/16* (2013.01)

(58) Field of Classification Search
USPC .................................................. 250/288, 286
See application file for complete search history.

(56) References Cited

U.S. PATENT DOCUMENTS 5,481,107 A    1/1996    Takada et al.
5,756,994 A    5/1998    Bajic
(Continued)

FOREIGN PATENT DOCUMENTS

JP    57-60653 A    4/1982
JP    7-85834 A    3/1995
(Continued)

OTHER PUBLICATIONS

International Search Report (PCT/ISA/210) issued in PCT Application No. PCT/JP2017/007699 dated May 30, 2017 with English translation (four (4) pages).
(Continued)

*Primary Examiner* — Phillip A Johnston
(74) *Attorney, Agent, or Firm* — Crowell & Moring LLP

(57) ABSTRACT

In order to make an analyzer with an ion mobility separation part have high durability and robustness, the analyzer includes an ion source, an ion mobility separation part which includes a pair of facing electrodes to which a high frequency voltage and a DC voltage are applied, and a shielding electrode which is provided between the ion source and the ion mobility separation part and to which a DC voltage is applied, wherein the shielding electrode includes an ion flow path connecting an inlet from which ions from the ion source are introduced and an outlet from which the ions are discharged thereinside, and the ion flow path is bent so that the outlet is unable to be seen from the inlet.

11 Claims, 9 Drawing Sheets

(51) Int. Cl.
*H01J 49/00* (2006.01)
*H01J 49/06* (2006.01)
*H01J 49/16* (2006.01)

(56) References Cited

U.S. PATENT DOCUMENTS

| | | | | |
|---|---|---|---|---|
| 6,953,928 B2* | 10/2005 | Vestal | ............... | H01J 49/0418 |
| | | | | 250/281 |
| 8,188,424 B2* | 5/2012 | Baykut | ............... | H01J 49/0413 |
| | | | | 250/281 |
| 8,822,915 B2* | 9/2014 | Mukaibatake | ........ | H01J 49/062 |
| | | | | 250/281 |
| 10,139,369 B2* | 11/2018 | Satake | ............... | G01N 27/624 |
| 2003/0155498 A1 | 8/2003 | Kato | | |
| 2009/0294650 A1 | 12/2009 | Schneider et al. | | |
| 2011/0101214 A1 | 5/2011 | Miller et al. | | |
| 2016/0327527 A1 | 11/2016 | Umeda et al. | | |

FOREIGN PATENT DOCUMENTS

| | | |
|---|---|---|
| JP | 2003-242926 A | 8/2003 |
| JP | 2004-71470 A | 3/2004 |
| JP | 2004-294453 A | 10/2004 |
| JP | 2013-502046 A | 1/2013 |
| WO | WO 2015/111311 A1 | 7/2015 |

OTHER PUBLICATIONS

Japanese-language Written Opinion (PCT/ISA/237) issued in PCT Application No. PCT/JP2017/007699 dated May 30, 2017 (six (6) pages).

* cited by examiner

[FIG. 1]
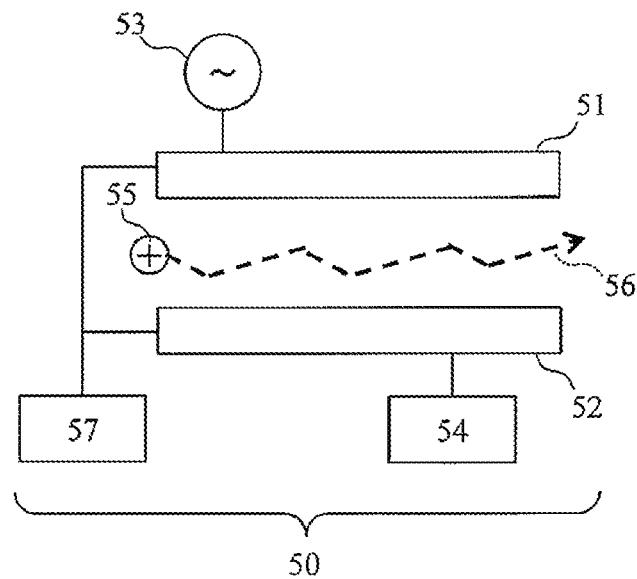
[FIG. 2]
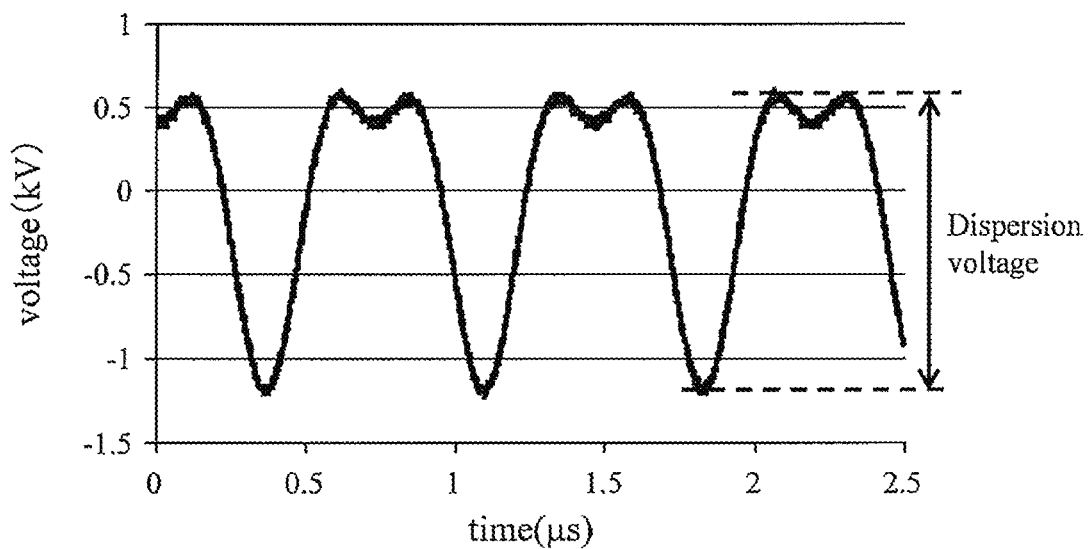

[FIG. 3]
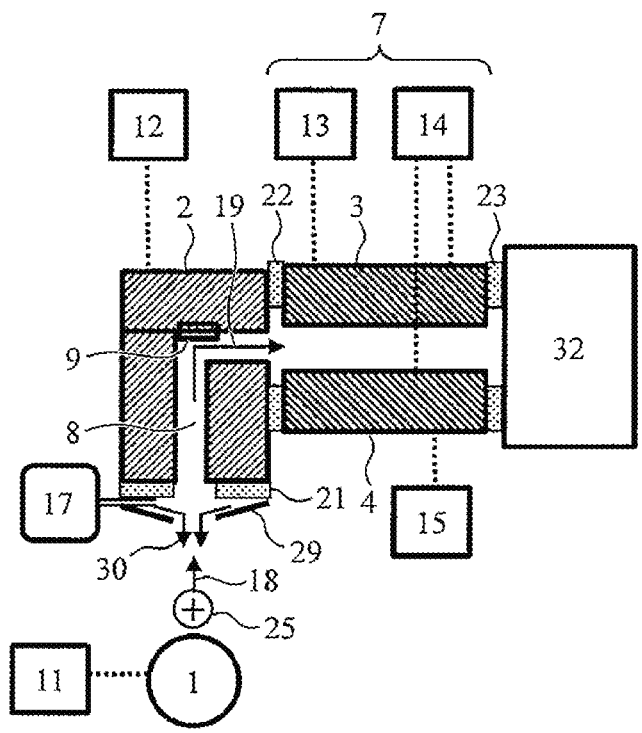
[FIG. 4]
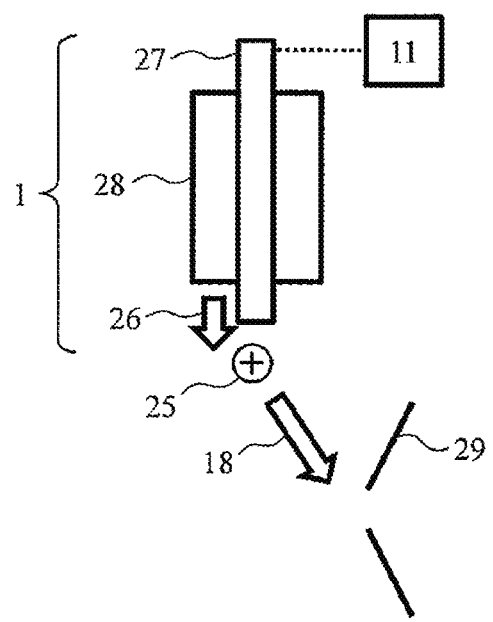

[FIG. 5]
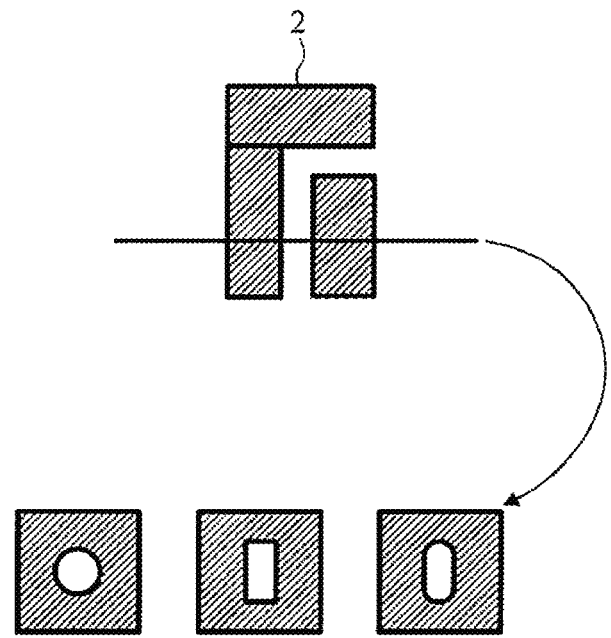
[FIG. 6]
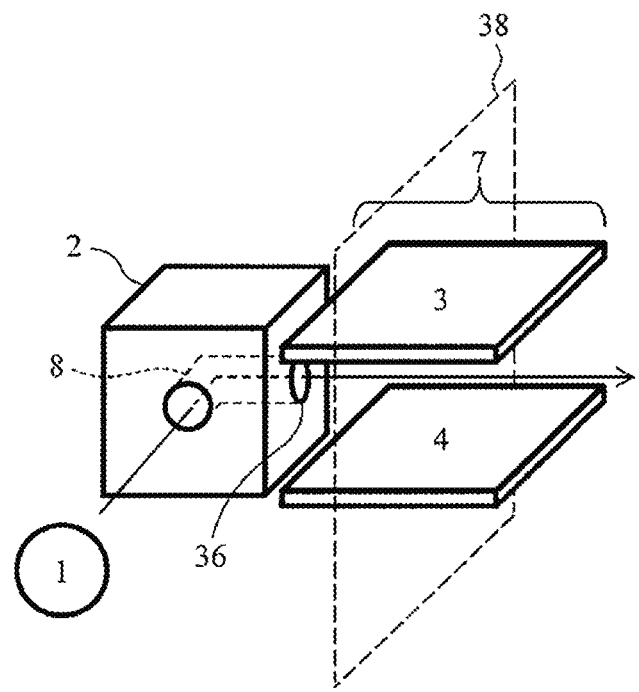

[FIG. 7]
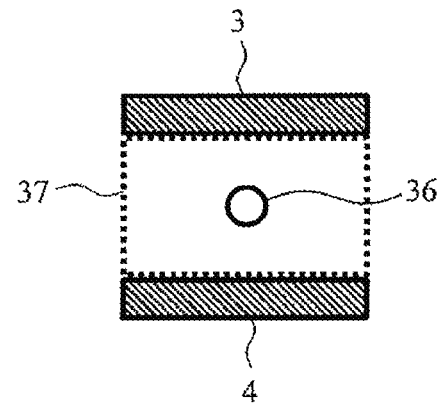
[FIG. 8]
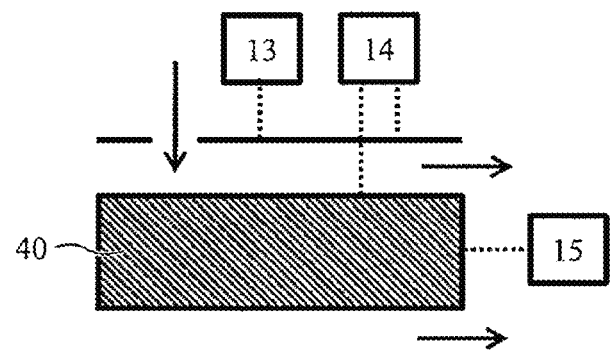
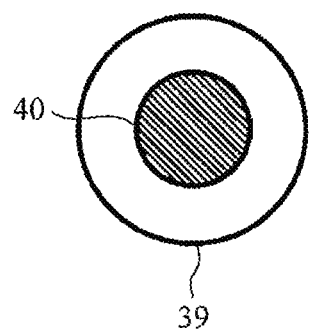

[FIG. 9]
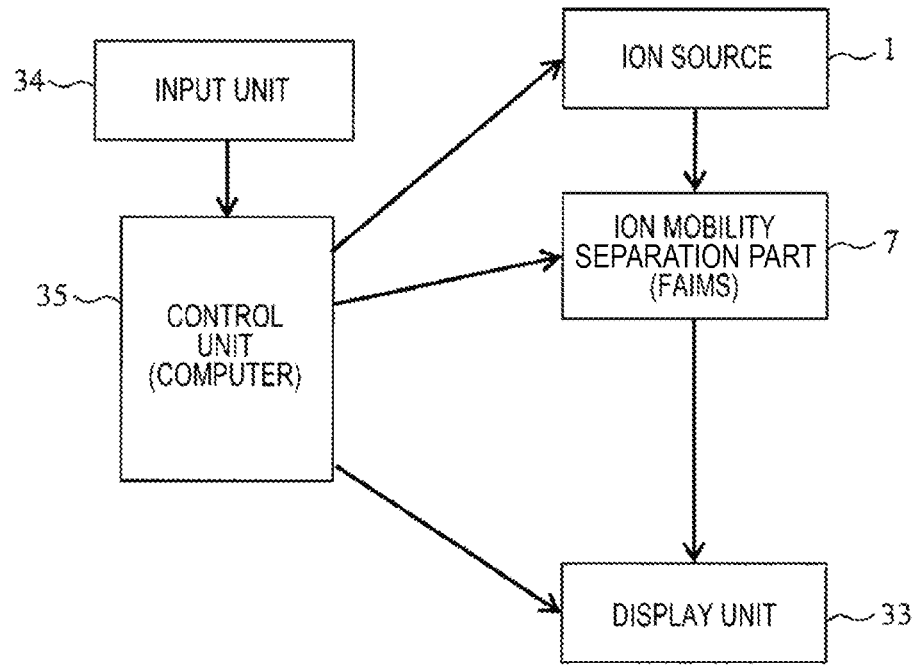
[FIG. 10]
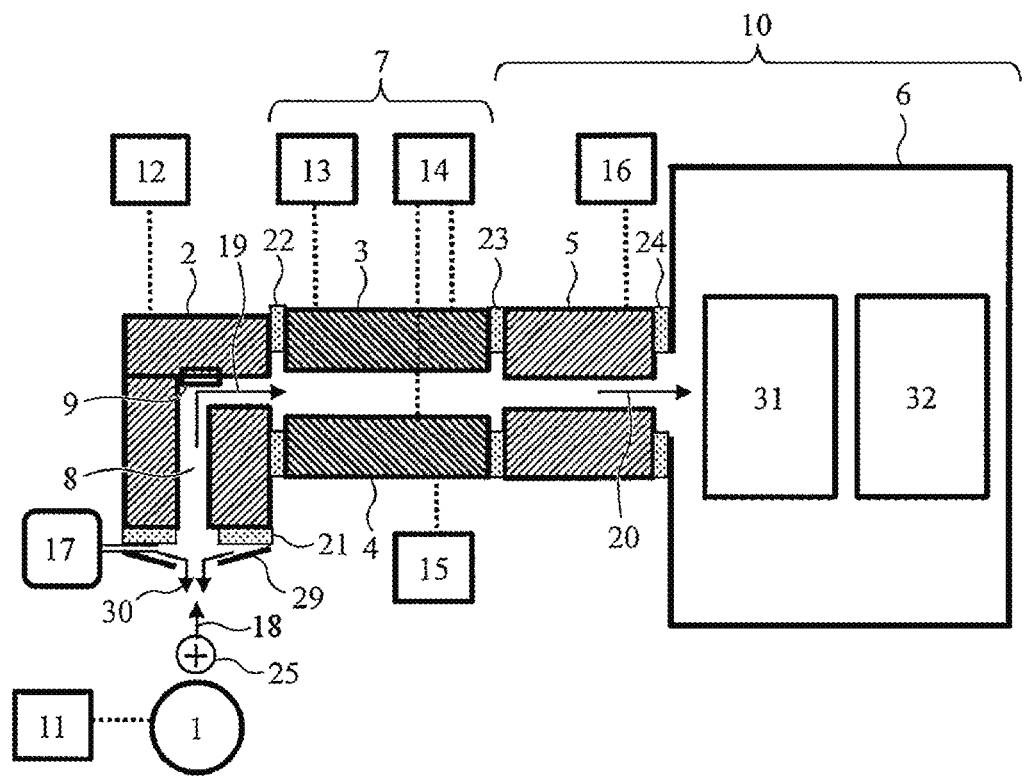

[FIG. 11]
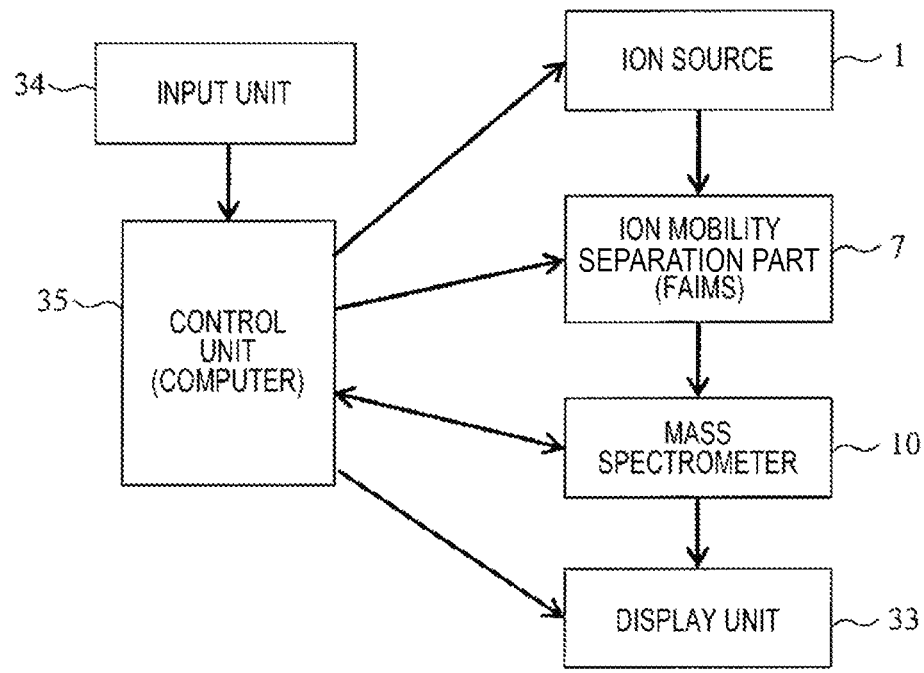
[FIG. 12]
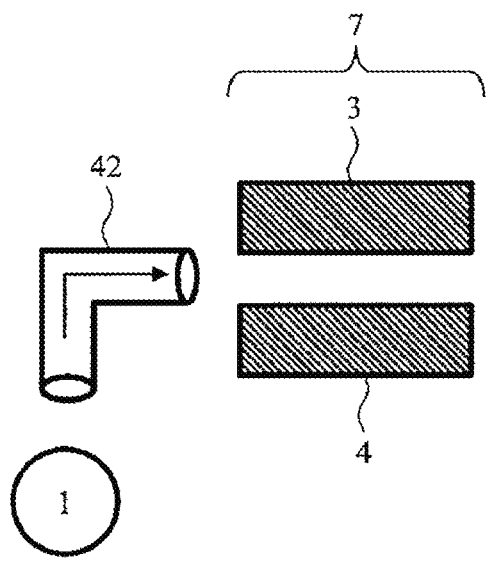

[FIG. 13]
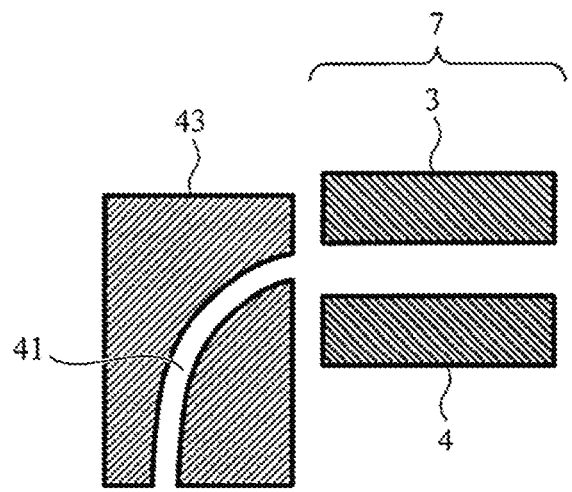
[FIG. 14]
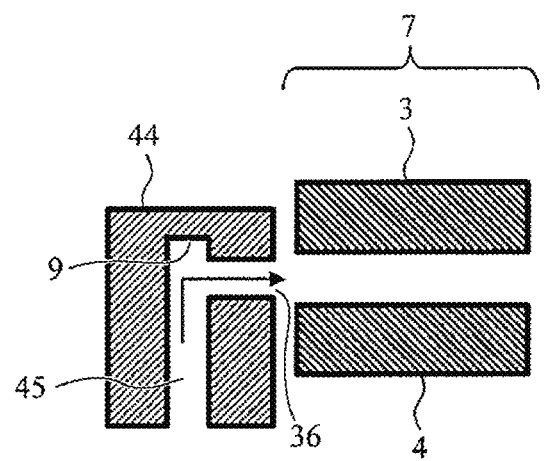

[FIG. 15]
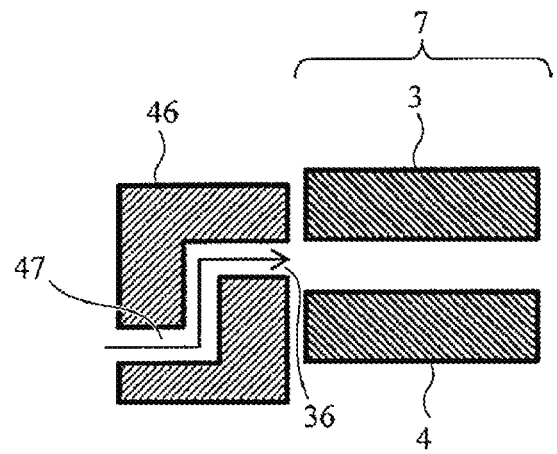
[FIG. 16]
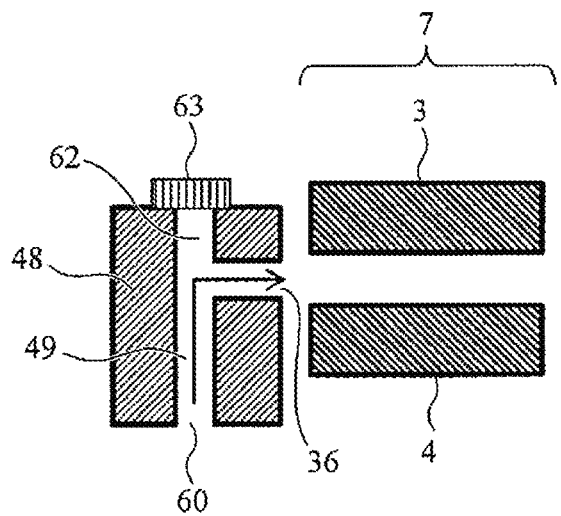

[FIG. 17]
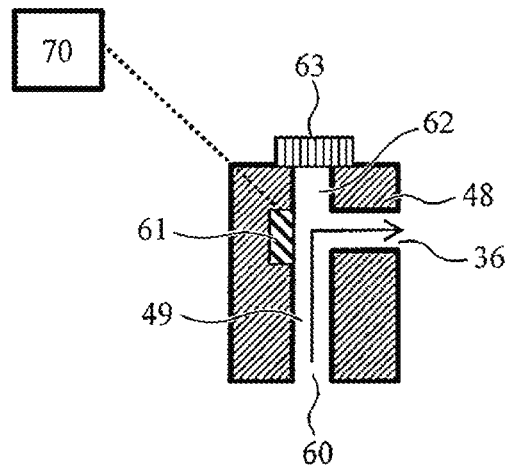
[FIG. 18]
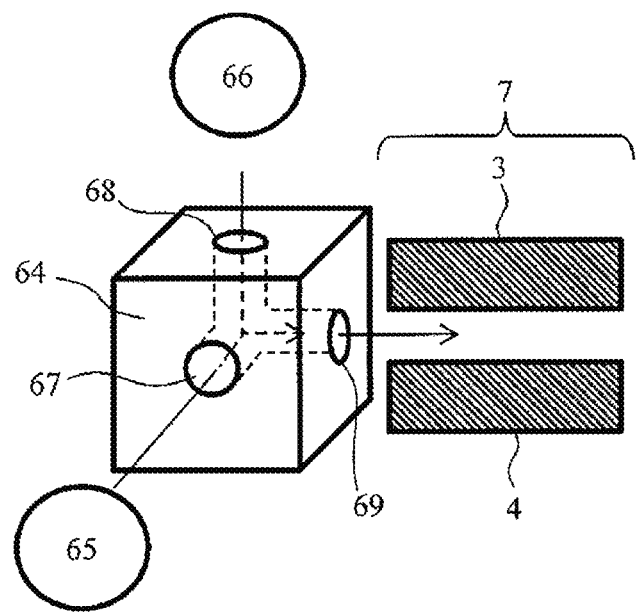

ANALYSIS DEVICE PROVIDED WITH ION MOBILITY SEPARATION PART

TECHNICAL FIELD

The present invention relates to an analyzer with an ion mobility separation part.

BACKGROUND ART

An ion mobility separator (or ion mobility device) which separates and detects ions by ion mobility is widely used as an on-site measurement device for environmental analysis, explosive detection, illegal drug detection, chemical agent detection, and the like due to the characteristic that it can operate even under atmospheric pressure without requiring a vacuum pump. The ion mobility separator separates ions in a gas phase under atmospheric pressure by utilizing the fact that the movement speed of the ions in the gas phase is different depending on the three-dimensional structure of a molecular ion. Therefore, a separation method is greatly different from a mass spectrometer which separates molecular ions in vacuum electric field or magnetic field. As a result, it is expected to separate isomeric ions having the same mass-to-charge ratio (m/z) difficult to separate with a mass spectrometer using an ion mobility separator. As one of the methods which is frequently used in recent years for an ion mobility separator, there is provided a Field asymmetric ion mobility spectrometer (FAIMS) or a Differential ion mobility spectrometer (DMS).

A mass spectrometer (MS) has high selectivity because ions can be separated by mass-to-charge ratio (m/z) of molecular ion in vacuum and it is possible to separate and detect ions with high sensitivity and high accuracy. A mass spectrometer is commonly used as a detector of liquid chromatograph (LC) and gas chromatograph (GC) and analytical methods called liquid chromatography mass spectrometry (LC/MS) and gas chromatography mass spectrometry (GC/MS) are often used. High sensitivity and high resolution are realized by time-separating samples, impurities, and other samples by LC and GC.

In addition, in a mass spectrometer, tandem mass spectrometry is used which decomposes measurement-target ions and measures decomposed ions (fragment ions) to enable separation from other impurity ions. This results in high mass resolution. Furthermore, the technology of a mass spectrometer capable of high sensitivity measurement such as a mass spectrometer realizing high resolution such as a Time-of-flight mass spectrometer (TOF/MS), a Fourier-transform mass spectrometer (FT/MS), a Fourier-transform ion cyclotron resonance mass spectrometer (FTICR/MS), and an Orbitrap mass spectrometer, or a Triple quadrupole mass spectrometer, and a Quadrupole mass spectrometer is advanced and the mass spectrometer is widely spreading mainly in bio and medical fields.

As described above, an ion mobility separator has different separation performance from a mass analyzer, and thus a measurement method combining a mass analyzer and an ion mobility separator has also been reported. PTLs 1 and 2 disclose examples of an apparatus in which an ion source, a FAIMS, and a mass spectrometer are combined. The FAIMS is located in a succeeding stage of the ion source and located in a preceding stage of the mass spectrometer. PTL 3 discloses an example of a mass spectrometer. Ion flow paths are bent in the succeeding stage of the ion source and in the preceding stage of the MS.

CITATION LIST

Patent Literature

PTL 1: US 2009/0294650 A1
PTL 2: WO 2015/111311 A1
PTL 3: U.S. Pat. No. 5,756,994

SUMMARY OF INVENTION

Technical Problem

In an ion mobility separator, the technology to detect ions with high sensitivity and high throughput after separating ions generated by an ion source is important for further expansion of application and reduction of false detection. However, the ion mobility separator (FAIMS or DMS) which separates and detects ions by ion mobility has the following problems at present.

In PTL 1, a device is configured in the order of an ion source, a curtain plate, a FAIMS, and a mass spectrometer, and noise components are removed using a curtain gas. A gas flow is generated from the MS side to the ion source side by flowing a curtain gas to a curtain plate portion and the gas reduces the entrance of noise components (or impurity components) such as charged droplets, neutral molecules, clusters, and the like generated by the ion source into the mass spectrometer. As a result, there is an effect of reducing contamination of the FAIMS and the mass spectrometer. However, the noise component cannot be completely eliminated with only the curtain gas. This is because the FAIMS located immediately behind the ion source is likely to be highly contaminated since samples and pretreated blood are constantly sprayed from the ion source. When the FAIMS is contaminated, there are problems in that sensitivity reduction and separation ability deterioration due to disturbance of the electric field occur, and the isolated voltage of the FAIMS tends to be discharged as the FAIMS is contaminated with ions and conductive substances. As described above, since the FAIMS is located immediately behind the ion source, it is easily contaminated by droplets and neutral molecules sprayed by the ion source. Therefore, the durability and robustness of the FAIMS are a major issue.

In PTL 2 discloses a configuration in which ions generated by an ion source pass through a counter electrode at a stage preceding an MS, enter between a preceding stage electrode and a succeeding stage electrode, and then are bent at 90 degrees to be incident on the MS. According to this configuration, it is described that droplets and neutral molecules are reduced at the front-stage electrode and the succeeding-stage electrode to reduce contamination of the MS. In PTL 3, a configuration is described that ions emitted from an ion source enter the MS, and other gases and noises flow to a discarding port. Although PTLs 2 and 3 can prevent contamination of a mass analyzer and improve durability, there is no description about an ion mobility separator. Therefore, there is a problem to apply the configuration to the ion mobility separator which is an object of the invention.

In view of such a circumstance, the invention provides an ion mobility separator capable of operating stably for a long time by improving durability and robustness of the ion mobility spectrometer.

Solution to Problem

According to the invention, there is provided an analyzer including an ion source, an ion mobility separation part which includes a pair of facing electrodes to which a high frequency voltage and a DC voltage are applied, and a shielding electrode which is provided between the ion source and the ion mobility separation part and to which a DC voltage is applied, wherein the shielding electrode includes anion flow path connecting an inlet from which ions from the ion source are introduced and an outlet from which the ions are discharged thereinside, and the ion flow path is bent so that the outlet is unable to be seen from the inlet.

Advantageous Effects of Invention

According to the invention, durability and robustness of an ion mobility separator are improved.

Further features relating to the invention will be apparent from the description and the accompanying drawings of this specification. Further, the problems, configurations, and effects other than those described above will be clarified by the description of the following embodiments.

BRIEF DESCRIPTION OF DRAWINGS

FIG. 1 is a schematic diagram illustrating a general configuration of a FAIMS.

FIG. 2 is a diagram illustrating a waveform of a separation voltage in the FAIMS.

FIG. 3 is a schematic cross-sectional view illustrating an example of an analyzer in which an ion mobility separation part and a detector are combined.

FIG. 4 is a schematic diagram illustrating details of an electrospray ion source.

FIG. 5 is a schematic cross-sectional view illustrating an example of a shape of an ion flow path of a shielding electrode.

FIG. 6 is a schematic perspective view illustrating a configuration example of the shielding electrode and the FAIMS.

FIG. 7 is a schematic cross-sectional view of the FAIMS.

FIG. 8 is a schematic cross-sectional view illustrating an example of the FAIMS constituted of cylindrical electrodes.

FIG. 9 is a diagram illustrating a configuration example of an analyzer using the FAIMS.

FIG. 10 is a schematic cross-sectional view illustrating an analyzer in which an ion mobility separation part and a mass spectrometer are combined.

FIG. 11 is a view for describing a configuration example of an analyzer using a FAIMS and a mass spectrometer.

FIG. 12 is a schematic cross-sectional view of a part of an analyzer.

FIG. 13 is a schematic cross-sectional view of a part of an analyzer.

FIG. 14 is a schematic cross-sectional view of a part of an analyzer.

FIG. 15 is a schematic cross-sectional view of a part of an analyzer.

FIG. 16 is a schematic cross-sectional view of a part of an analyzer.

FIG. 17 is a schematic cross-sectional view illustrating another configuration example of a shielding electrode.

FIG. 18 is a schematic view of a part of an analyzer.

DESCRIPTION OF EMBODIMENTS

Hereinafter, embodiments of the invention will be described with reference to the accompanying drawings. The accompanying drawings illustrate specific embodiments in accordance with the principle of the invention, but these are for understanding of the invention and are not used to interpret the invention in a limited way.

FIG. 1 is a schematic diagram illustrating a general configuration of a FAIMS. A FAIMS 50 includes two flat plate electrodes 51 and 52 made of a conductor such as a metal. The distance between those two flat plate electrodes is about 0.1 mm to several mm and ions flight through an ion transmission region therebetween. Both the width and length of the flat plate electrode corresponding to the width and distance of ion flying are about several mm to several tens of mm. In addition, in recent years, a FAIMS having a further miniaturized structure also exists and there are structures in which a distance between electrodes is reduced to about several tens of micrometers.

The FAIMS includes an AC voltage power supply 53, a DC voltage power supply 54, and a DC voltage power supply 57. In the FAIMS, a separation voltage (or a dispersion voltage) obtained by superimposing a high frequency voltage is applied on the flat plate electrode 51 with the AC voltage power supply 53, in such a manner that a high frequency electric field is applied between the flat plate electrode 51 and the flat plate electrode 52. As described in the example of the separation voltage illustrated in FIG. 2, the separation voltage is applied such that a high voltage (plus voltage) and a low voltage (minus voltage) are repeatedly applied for a certain period and applied so as to be 0 on a time average. The voltage amplitude which is the difference between the maximum value and the minimum value of the separation voltage is about 5 kV at the maximum. In addition, by applying a compensation voltage (or a correction voltage) generated by the DC voltage power supply 54 to the flat plate electrode 52, an ion trajectory 56 of a specific ion 55 is corrected so that only the specific ion 55 can be transmitted and other ions can be excluded. This compensation voltage is about −100 V to +100 V and the compensation voltage is changed by ions to be transmitted.

Unlike the example illustrated in the drawing, even when a separation voltage generated by the AC voltage power supply 53 is applied to the flat plate electrode 52, it is possible to separate ions. In this case, the DC voltage power supply 54 may be applied to the flat plate electrode 52 as illustrated in the drawing or may be applied to the flat plate electrode 51. However, depending on the flat plate electrode to which the voltage is applied, the positive and negative sign of the compensation voltage is reversed. In addition, when a measurement target is positive ions, the same positive DC voltage is applied to the flat plate electrode 51 and the flat plate electrode 52 by the DC voltage power supply 57 and the positive voltage which is equal to or lower than that of an electrode located in a preceding stage of the FAIMS 50 and equal to or higher than that of an electrode on a succeeding stage of the FAIMS 50 is applied, in such a manner that ions coming from the preceding stage are efficiently introduced into the FAIMS and are efficiently discharged to the succeeding stage.

In the invention, a shielding electrode for blocking droplets and neutral molecules as contaminated materials is provided between an ion source and the FAIMS as an ion mobility separator. By the shielding electrode, contamination of the FAIMS is greatly reduced and the durability of the FAIMS is improved, and further stable data acquisition is possible for a long time.

First Embodiment

A first embodiment will be described. FIG. 3 is a schematic cross-sectional view illustrating an example of an analyzer in which an ion mobility separation part of the embodiment and a detector are combined. FIG. 4 is a schematic diagram illustrating details of an electrospray ion source as an example of an ion source 1.

In this embodiment, a shielding electrode 2 including an L-shaped ion flow path bent almost at right angles is inserted between the ion source 1 and a FAIMS 7 as an ion mobility separation part. Components of the analyzer are the ion source 1, the shielding electrode 2, the FAIMS 7 constituted of flat plate electrodes 3 and 4, and a detector 32. Ions 25 generated by the ion source 1 are attracted by electric fields and gas flows to be incident on the analyzer from an electrode 29 along an ion flow 18. Then, the ions pass through an ion flow path 8 of the shielding electrode 2 along an ion flow 19 and enter an ion transmission region which is a space between the flat plate electrodes 3 and 4 constituting the FAIMS 7. After the ions are separated by the FAIMS 7, only ions that have passed through the ion transmission region are detected by the detector 32.

The FAIMS 7 is constituted of the flat plate electrodes 3 and 4 as separation electrodes and an AC voltage and a DC voltage are applied to the flat plate electrode 3 by an AC voltage power supply 13 and a DC voltage power supply 14. The same DC voltage as that of the flat plate electrode 3 is applied to the flat plate electrode 4 by the DC voltage power supply 14. Further, a compensation voltage is applied to the flat plate electrode 4 by a DC voltage power supply 15 separately. It is possible to select ions to be transmitted by changing this compensation voltage and a differential mobility spectrum can be acquired by scanning the compensation voltage.

The electrode 29 includes a gas control unit 17 and generates a gas flow 30 which blows gas supplied from the gas control unit 17 to the ion source 1 side so that noise components such as droplets and neutral molecules generated by the ion source are eliminated. Therefore, there is an effect of making it difficult for the noise components to enter the FAIMS 7. As described above, this gas flow 30 reduces contamination of the FAIMS and the detector, but it is not sufficient. Therefore, in the embodiment, the shielding electrode 2 is used to further remove and reduce noise components such as droplets.

As illustrated in FIG. 4, in an electrospray ion source which is the ion source 1, a liquid sample passes through the inner portion of a pipe 27 and is sprayed. A high voltage as high as 1 kV to 5 kV is applied to the pipe 27 by a DC voltage power supply 11 and an electric field is generated between the pipe 27 and the electrode 29. A voltage of about several hundred volts is applied to the electrode 29. A spray is generated by electrostatic spraying by the electric field and the liquid sample is atomized to generate the ions 25 by charge repulsion. In spraying, a gas 26 such as a nebulizer gas or a heating gas is caused to flow between a pipe 28 and the pipe 27 in order to promote desolvation and trimming of liquid. Nitrogen gas and air are often used as gases 26 and 30. For the pipe 27, a glass pipe, a glass capillary, a metal capillary and the like are used.

The shielding electrode 2 of the embodiment is made of a conductor such as a metal, for example, and the ion flow path 8 thereof includes a portion bent substantially at right angle, that is, a portion bent to 90 degrees±10 degrees. In the example illustrated in the drawing, there are one ion inlet and one ion outlet. That is, in the inner portion of the shielding electrode of the embodiment, an ion flow path which connects an inlet from which ions from the ion source are introduced and an outlet from which ions are discharged is provided and the ion flow path is bent so that the outlet cannot be seen from the inlet. By bending the ion flow path by 90 degrees, noise components such as heavy droplets and neutral molecules collide with a collision portion 9 in the flow path, in such a manner that it is possible to reduce contamination of the flat plate electrodes 3 and 4 due to noise, the flat plate electrodes constituting the FAIMS 7 in a succeeding stage.

FIG. 5 is a schematic cross-sectional view illustrating an example of a shape of an ion flow path of the shielding electrode 2. The shape of the ion flow path of the shielding electrode 2 is cylindrical and the cross-sectional shape thereof is typically circular having a diameter of about 0.01 mm to 10 mm. The shape of the ion flow path may be a rectangular tube shape and the cross-section thereof may be a square or a rectangle with one side of about 0.01 mm to 10 mm. Furthermore, the cross-sectional shape of the ion flow path may be elliptical, polygonal, or a shape similar thereto.

A DC voltage is applied to the shielding electrode 2 by a DC voltage power source 12. In addition, a DC voltage is applied to each electrode of the electrode 29, the flat plate electrode 3, and the flat plate electrode 4 so that the ions generated by the ion source 1 flow smoothly toward the detector 32. In order to apply different voltages to the plurality of electrodes, insulators 21, 22, and 23 are inserted as spacers between the electrodes. Typically, when ions to be detected are positive ions, the voltage is set to be lowered in the order of the electrode 29, the shielding electrode 2, the flat plate electrode 3, and the flat plate electrode 4, and a voltage between 0 V and 1,000 V is applied to each electrode. The shielding electrode 2 of this embodiment is a conductor and only a DC voltage is applied from the DC voltage power source 12, and thus the entirety of the shielding electrode 2 is at the same potential and an electric field is not generated in the ion flow path 8. However, when dirt accumulates in the collision portion 9, potential differing to some extent (about several V) is applied to the collision portion 9 due to accumulated dirt, sample ions, and contaminant ions. However, since the flow of ions inside the shielding electrode 2 is governed by the gas flow, the potential of the collision portion 9 rarely causes, and thus the ions can pass through the shielding electrode 2 without loss.

Next, a method of removing noise components such as droplets, clusters, and neutral molecules by the shielding electrode 2 will be described. A gas flow rate of the ion flow path 8 inside the shielding electrode 2 is, for example, about 0.1 L/min to 10 L/min. The cross-sectional area of the shielding electrode 2 is, for example, about 0.1 mm$^2$ to 100 mm$^2$. A mass of the ion is about 10 Da to 1,000 Da, a mass of the droplet is about 1 million Da to 10 million Da, and the ratio of the mass of the droplet to the mass of the ion is 10 to 1 million. The ion collision cross section is about $10^{-18}$ m$^2$, the droplet collision cross-sectional area is about $10^{-16}$ m$^2$, and the ratio of the cross-sectional area of the droplet to the cross-sectional area of the ion is 100.

A drag force F that a substance receives from an air current caused by a gas flow can be expressed as follows using a constant A, a mass m of the substance, and a cross-sectional area S of the substance.

$$F = A \times S/m$$

A drag force $F_2$ of the ion with respect to the drag force $F_1$ of the droplet is expressed by the following equation using a mass $m_1$ of the droplet, a cross-sectional area $S_1$, a mass $m_2$ of the ion, and a cross-sectional area $S_2$.

$$F_2/F_1 = (S_2 * m_1)/(S_1 * m_2) = 10 \sim 10{,}000$$

This result shows that ions per unit mass receive a drag force of approximately 10 to 10,000 times compared to droplets.

That is, the ions tend to bend along an air current of the gas by 90 degrees to be introduced to the FAIMS and the detector without colliding with an inner wall of the flow path of the shielding electrode 2. On the contrary, the noise components such as the droplets are not likely to bend, so the possibility of colliding with the inner wall of the ion flow path of the shielding electrode is high near the collision portion 9, and thus the noise components are not introduced to the FAIMS or the detector. Therefore, the FAIMS and the detector are less likely to be contaminated, and thus the durability and the robustness are improved.

The shielding electrode 2 is heated to about 100° C. to 200° C., and thus the solvent of a liquid sample which collided with the collision portion 9 of the shielding electrode 2 volatilizes quickly. Contaminants adhere to the collision portion 9 of the shielding electrode 2 as dirt and gradually vaporize as the shielding electrode 2 is heated. Even when vaporized contaminants are introduced into the FAIMS or the detector, there is a difference in introduction time from that of ions, so that it does not hinder the analysis of ions.

The insulators 21, 22, and 23 are inserted between the electrodes such as the electrode 29, the shielding electrode 2, and the flat plate electrodes 3 and 4 to which voltages are applied and between the detector 32 and the electrode. This is because different voltages are applied to the respective electrodes. Particularly, the AC voltage power supply 13 applies an AC voltage to the flat plate electrode 3 of the FAIMS 7. However, a high voltage of about 1 kVpp to 5 kVpp is applied to this AC voltage, and therefore it is necessary to prevent discharge to the surrounding electrodes. For example, a distance between the electrodes to be discharged can be known from the voltage to be applied according to the relationship (Paschen's law) between a pressure, a distance, and the voltage which can be applied. For example, if it is desired to apply a voltage of about 3 kV to 5 kV at 1 atm, it is understood that the distance between the electrodes may be set to about 1 mm. In the case of application of AC voltage like the FAIMS, it becomes further easier to be discharged, so it is necessary to set the distance between the electrodes to 1.5 mm or the like in order to design more safely. That is, it is necessary to provide a distance of about 1.5 mm between the shielding electrode 2 and the flat plate electrode 3. When the distance between the electrodes increases, the probability that the ions orbital-diffuse and collide with the electrodes and the like, so the ions collapse and disappear is increased and the probability that the sensitivity decreases is increased. Therefore, it is desirable to shorten the distance between the electrodes as much as possible. Therefore, it is preferable that the distance between the shielding electrode 2 and the flat plate electrode 3 is longer than a discharge limit distance and as short as possible and the thickness of the insulator 22 is preferably about 1.5 mm which is the distance between the electrodes that are not discharged. The distance between the flat plate electrode 3 and the detector 32 at the succeeding stage can also be considered and the thickness of the insulator 23 is preferably about 1.5 mm.

Next, the positional relationship between an outlet of the shielding electrode 2 and the flat plate electrodes 3 and 4 will be described. FIG. 6 is a schematic perspective view illustrating a configuration example of the shielding electrode 2 and the FAIMS 7 and FIG. 7 is a schematic cross-sectional view of the FAIMS in a plane 38 illustrated in FIG. 6. As illustrated in the drawings, an outlet 36 of the shielding electrode 2 needs to be located inside a cross-section 37 formed between the flat plate electrodes 3 and 4. That is, the outlet of the ion flow path provided inside the shielding electrode needs to be located in the ion transmission region between a pair of facing electrodes of the FAIMS (ion mobility separation part). This is because the space for separating ions in the FAIMS 7 is the region of cross-section 37, so that the outlet 36 of the shielding electrode 2 is arranged inside the cross-section 37, and thus ions are efficiently introduced from the shielding electrode 2 to the FAIMS 7 without loss.

It is preferable that the material of the shielding electrode 2 is a conductor such as a metal. This is because, when the shielding electrode 2 is an insulator, the insulator is charged up due to ions, charged droplets, or the like, and ion transmission becomes difficult due to charge repulsion. The material of the shielding electrode 2 may be a metal such as stainless steel, iron, gold, copper, aluminum, or any other conductor. In addition, the shielding electrode 2 may not be entirely made of metal and the main body may be made of insulator such as plastics, ceramics, and vespel or a material having low electric conductivity, and further the inner surface of the ion flow path 8 provided in the shielding electrode 2 may be plated or coated with a conductor such as a metal so as to have conductivity. In this way, the shielding electrode 2 suffices when at least the inner surface of the ion flow path 8 through which ions pass is a made of a conductor.

Although the FAIMS is described by way of the example in which it is constituted of two flat plate electrodes arranged to face each other, it is also possible to separate ions in a portion between two facing cylindrical electrodes. FIG. 8 is a schematic cross-sectional view illustrating an example of the FAIMS constituted of cylindrical electrodes. The FAIMS includes an electrode 39 and an electrode 40 arranged coaxially inside the electrode 39 and includes an AC voltage power supply 13, a DC voltage power supply 14, and a DC voltage power supply 15. The voltage application method and operation are the same as in the example of FIG. 3. In the illustrated example, the electrode 39 is constituted of a hollow cylindrical electrode and the electrode 40 is constituted of a solid cylindrical electrode, but the electrode 40 may also be constituted of a hollow cylindrical electrode. This embodiment can be similarly applied to a FAIMS including such a cylindrical electrode or other known FAIMS.

The ionization method implemented in the ion source 1 is an ionization method commonly used in a mass spectrometer such as electrospray ionization (ESI), atmospheric pressure chemical ionization (APCI), matrix-assisted laser desorption ionization (MALDI), desorption electrospray ionization (DESI), and atmospheric pressure photoionization (APPI).

FIG. 9 is a diagram illustrating a configuration example of an analyzer using the FAIMS 7 as an ion mobility separation part. Ions generated by the ion source 1 are ion-separated in the FAIMS 7 as an ion mobility separation part, and then the ions are ion-detected by a detector. A control unit 35 controls each constituent element of the FAIMS 7 and is constituted of an information processing apparatus such as a personal computer. The control unit 35 includes a central processing unit, a main storage unit, and an auxiliary storage unit and is connected to an input unit 34 and a display unit 33. The central processing unit is constituted of a processor (also referred to as a computing unit) such as a CPU, for example. The auxiliary storage device is, for example, a hard disk and the main storage device is a memory. The display unit 33 is a display or the like and analysis spectra, results, and analysis conditions are displayed. The input unit 34 is a keyboard, a pointing device (mouse or the like), or the like and can input analysis conditions and the like.

As described above, a shielding electrode including an ion flow path provided therein and bent so that the outlet cannot be seen from the inlet is installed in front of the FAIMS, and thus noise components such as droplets, clusters, and neutral molecules which are not used for analysis can be removed and reduced and contamination of an ion mobility separation part such as a FAIMS and a detector in a succeeding stage is greatly reduced, and further durability and robustness of the FAIMS are improved. As a result, problems of sensitivity reduction, resolution capability reduction of the ion mobility separation part, and discharging of the ion mobility separator are solved and there is the merit in that the maintenance becomes unnecessary for a long time.

Second Embodiment

A second embodiment will be described. FIG. 10 is a schematic cross-sectional view illustrating an analyzer in which an ion mobility separation part and a mass spectrometer of the embodiment are combined.

The difference from the first embodiment is that ion 25 passes through the FAIMS 7, and then the ion 25 passes through a first pore electrode 5, which is a vacuum partition wall for keeping the interior of the mass spectrometer 10 in a vacuum state, along an ion flow 20 and enters a mass spectrometry section 6. In the mass spectrometry section 6, ions are separated by an ion separation analysis unit 31 and detected by the detector 32. A DC voltage is applied from a DC voltage source 16 to the first pore electrode 5. Insulators 23 and 24 are arranged between the flat plate electrodes 3 and 4 of the FAIMS 7 and the first pore electrode 5 and between the first pore electrode 5 and the mass spectrometry section 6.

An ion mobility separation part including a FAIMS and a DMS can operate under atmospheric pressure or sub-atmospheric pressure. Parts of the shielding electrode 2 and the FAIMS 7 are highly confidential to gas from the viewpoint of maintaining high sensitivity, and thus the air pressure of the FAIMS 7 part is determined by the conductance of an ion flow path of the shielding electrode 2, the conductance of an ion flow path of the first pore electrode 5, and the pumping speed of a vacuum pump of the mass spectrometry section 6. For example, in order to operate the ion mobility separation part under atmospheric pressure or sub-atmospheric pressure, it is preferable that the conductance of the ion flow path 8 of the shielding electrode 2 be about five times or more the conductance of the ion flow path of the first pore electrode 5.

The mass spectrometer 10 may be any known mass spectrometer. For example, it is an ion trap mass spectrometer such as a three-dimensional ion trap or a linear ion trap, a quadrupole filter, a triple quadrupole mass spectrometer, a time-of-flight mass spectrometer, a Fourier transform ion cyclotron resonance mass spectrometer, an orbitrap mass spectrometer, a magnetic field mass spectrometer, or the like. Further, a known mass spectrometer other than the mass spectrometer described above may be used.

FIG. 11 is a view for describing a configuration example of an analyzer using the FAIMS 7 as the ion mobility separation part and the mass spectrometer 10. The ions generated by the ion source 1 are ion-separated by the FAIMS 7 as the ion mobility separation part, and then the ions are separated and analyzed in the mass spectrometer 10 and the ions are ion-detected. The control unit 35 controls each constituent element of the FAIMS 7 and the mass spectrometer and is constituted of an information processing apparatus such as a personal computer. The configurations of the control unit 35, the display unit 33, and the input unit 34 are the same as those of the first embodiment and detailed description thereof will not be repeated.

Third Embodiment

A third embodiment will be described. FIG. 12 is a schematic cross-sectional view of a part of an analyzer of the embodiment. An ion source at a preceding stage and a FAIMS, a detector, or a mass spectrometer at a succeeding stage may have the same configuration and operation as those of the first embodiment or the second embodiment, so that the illustration and description thereof are not repeated.

This embodiment is different from the first embodiment in the shape of a shielding electrode 42. The shielding electrode 42 of the embodiment is a pipe-shaped electrode bent in an L shape, as illustrated in the drawing. The shielding electrode 42 is arranged between the ion source 1 and the FAIMS 7 constituted of the flat plate electrodes 3 and 4. The inlet, the outlet, and the ion flow path of the shielding electrode 42 are the same as those of the shielding electrode 2 described in the first embodiment and the ion flow path is bent so that the outlet from which the ions are discharged cannot be seen from the inlet from which the ions are introduced. In the case of the embodiment, the ion flow path includes a portion bent at a substantially right angle in the middle. The shielding electrode 42 of the embodiment is constituted of, for example, a metal pipe or a ceramic pipe of which the inner surface is coated with metal.

However, the configuration of the shielding electrode of the embodiment is not limited to that illustrated in the drawings and other known configurations and shapes may be used as long as the inner surface of the ion flow path is coated with a conductor.

The flow path shape, the cross-sectional shape, the size, and the like of the ion flow paths other than the above are the same as those of the previous embodiments.

Fourth Embodiment

Other shapes of the shielding electrode will be described in the following embodiments. FIG. 13 is a schematic cross-sectional view of apart of an analyzer of a fourth embodiment. An ion source at a preceding stage and a FAIMS, a detector, or a mass spectrometer at a succeeding stage may have the same configuration and operation as those of the first embodiment or the second embodiment, so that the illustration and description thereof are not repeated.

This embodiment is different from the previous embodiments in that a shape of an ion flow path 41 formed inside a shielding electrode 43 is not a combination of straight lines but a curve. The ion flow path 41 of the curve is bent so that it is not possible to see the outlet from which ions are discharged from the inlet from which the ions are introduced. The ion flow path is formed into a curved shape without corners, and thus, unlike the previous embodiments, turbulence of ions is expected to be less likely to occur, so improvement of ion transmission efficiency can be expected.

The flow path shape, the cross-sectional shape, the size, and the like of the ion flow paths other than the above are the same as those of the previous embodiments.

Fifth Embodiment

A fifth embodiment will be described. FIG. 14 is a schematic cross-sectional view of a part of an analyzer of the fifth embodiment. An ion source at a preceding stage and a FAIMS, a detector, or a mass spectrometer at a succeeding stage may have the same configuration and operation as those of the first embodiment or the second embodiment, so that the illustration and description thereof are not repeated.

This embodiment is different from the previous embodiments in that the collision portion 9 of a droplet of an ion flow path 45 formed inside a shielding electrode 44 is recessed in a concave shape. That is, the ion flow path 45 is bent so that an outlet cannot be seen from an inlet, and further the bent portion is recessed in a concave shape. Since the collision portion 9 of a droplet is recessed in a concave shape, even when contaminants contained in the droplet accumulate in the recessed portion, the influence on the ion flow and the charge repulsion with ions is reduced. Therefore, it is expected that the durability of the shielding electrode 44 will be improved. The depth of the concave recessed portion may be 0.1 mm or more.

The flow path shape, the cross-sectional shape, the size, and the like of the ion flow path other than that the collision portion 9 of the droplet is recessed in a concave shape are the same as those of the previous embodiments

Sixth Embodiment

A sixth embodiment will be described. FIG. 15 is a schematic cross-sectional view of a part of an analyzer of the sixth embodiment. An ion source at a preceding stage and a FAIMS, a detector, or a mass spectrometer at a succeeding stage may have the same configuration and operation as those of the first embodiment or the second embodiment, so that the illustration and description thereof are not repeated.

This embodiment is different from the previous embodiment in that an ion flow path 47 formed inside a shielding electrode 46 is bent twice at almost a right angle. That is, the ion flow path 47 is bent twice so that the outlet cannot be seen from the inlet. It is expected that many droplets can be removed by bending the ion flow path twice, and thus the durability of the FAIMS will be further improved. The number of times the ion flow path is bent may be two or more. Further, the corner of the flow path may be curved.

The flow pat shape, the cross-sectional shape, the size, and the like of the ion flow path other than the number of times of bending are the same as those of the previous embodiments.

Seventh Embodiment

A seventh embodiment will be described. FIG. 16 is a schematic cross-sectional view of a part of an analyzer of the seventh embodiment. An ion source at a preceding stage and a FAIMS, a detector, or a mass spectrometer at a succeeding stage may have the same configuration and operation as those of the first embodiment or the second embodiment, so that the illustration and description thereof are not repeated.

This embodiment is different from the previous embodiment in that an ion flow path 49 formed inside a shielding electrode 48 includes a first outlet 36 at a position where the outlet cannot be seen from an inlet 60 and an outlet 62 penetrating straight from the inlet 60, that is, a second outlet 62 at a position where the outlet can be seen from the inlet 60, is provided. During the analysis, the second outlet 62 is blocked by a detachable plate member 63. In this embodiment, droplets introduced from the inlet of the ion flow path 49 travel straight and are removed by travelling in a direction toward the second outlet 62. The droplet travelling towards the second outlet collides with the plate member 63 blocking the second outlet 62 and soils the plate member 63. The plate member 63 is a separate member from the shielding electrode 48 and detachable, and thus it can be periodically removed and cleaned. On the other hand, the ions flow along the airflow toward the first outlet 36 and it is possible for the ions to go to the FAIMS 7 and the detector or the mass spectrometer. The plate member 63 can be made of a material which makes it easy to wash the surface contamination, such as metal, plastic, glass, ceramic, or the like.

FIG. 17 is a schematic cross-sectional view illustrating another configuration example of the shielding electrode 48. An electrode 61 is newly provided at a position facing the first outlet 36 of the ion flow path 49 provided in the shielding electrode 48. When ions to be detected are positive ions, by applying a voltage of about plus several V to plus several hundred V to the electrode 61 from a DC voltage power source 70, it is possible to push the ions entering from the inlet 60 toward the first outlet 36, and thus it becomes possible to improve the sensitivity. When the ions to be detected are negative ions, the polarity of the voltage applied to the electrode 61 from the DC voltage power source 70 is inverted and a voltage of about minus several V to minus several hundred V is applied.

The flow path shape, the cross-sectional shape, the size, and the like of the ion flow paths other than the above are the same as those of the previous embodiments.

Eighth Embodiment

An eighth embodiment will be described. FIG. 18 is a schematic cross-sectional view of a part of an analyzer of this embodiment. An ion source at a preceding stage and a FAIMS, a detector, or a mass spectrometer at a succeeding stage may have the same configuration and operation as those of the first embodiment or the second embodiment, so that the illustration and description thereof are not repeated.

This embodiment is different from the previous embodiment in that an ion flow path formed inside a shielding electrode 64 includes two inlets constituted of a first inlet 67 and a second inlet 68 and one outlet 69. The ion flow path has a bent shape, and thus the outlet 69 cannot be seen from both the first inlet 67 and the second inlet 68. In addition, an ion flow path starting from the first inlet 67 and an ion flow path starting from the second inlet 68 join a single flow path ending at one outlet 69 in the middle. The analyzer includes two ion sources, a first ion source 65 and a second ion source 66, and it is possible to introduce ions from the first inlet 67 and the second inlet 68, respectively. On the other hand, the ions exit from the common outlet 69 and move toward the FAIMS 7. According to this embodiment, it is possible to measure ions generated by two different ion sources 65 and 66.

The ionization method implemented in the first ion source 65 and the second ion source 66 is a known ionization method commonly used in a mass spectrometer such as electrospray ionization (ESI), atmospheric pressure chemical ionization (APCI), matrix-assisted laser desorption ionization (MALDI), desorption electrospray ionization (DESI), and atmospheric pressure photoionization (APPI). Although not illustrated, when analysis is performed using the first ion source 65, it is preferable that the inlet 67 be open and the inlet 68 of the second ion source 66 not in use be closed. When the second ion source 66 is used, the inlet 68 is open and the inlet 67 is closed. The closure of the inlet is performed by, for example, a valve.

The flow path shape, the cross-sectional shape, the size, and the like of the ion flow paths other than the above are the same as those of the previous embodiments.

The invention is not limited to the embodiments described above and various modified examples are included. For example, the embodiments described above are described in detail in order to explain the invention in an easy-to-understand manner and are not necessarily limited to those having all the described configurations. Further, a part of the configuration of one embodiment can be replaced by the configuration of another embodiment and the configuration of another embodiment can be added to the configuration of one embodiment. In addition, it is possible to add, delete, and replace other configurations with respect to a part of the configuration of each embodiment.

REFERENCE SIGNS LIST

1: ion source
2: shielding electrode
3, 4: flat plate electrode
5: first pore electrode
6: mass spectrometry section
7: FAIMS
8: ion flow path
9: collision portion
10: mass spectrometer
17: gas control unit
21, 22, 23, 24: insulator
32: detector

The invention claimed is:

1. An analyzer, comprising:
an ion source;
an ion mobility separation part which includes a pair of facing electrodes to which a high frequency voltage and a DC voltage are applied; and
a shielding electrode which is provided between the ion source and the ion mobility separation part and to which a DC voltage is applied, wherein
the shielding electrode includes an ion flow path connecting an inlet from which ions from the ion source are introduced and an outlet from which the ions are discharged thereinside, and
the ion flow path is bent so that the outlet is unable to be seen from the inlet.

2. The analyzer according to claim 1, wherein
the ion flow path includes a portion bent substantially at a right angle.

3. The analyzer according to claim 1, wherein
a distance between the outlet of the shielding electrode and the pair of facing electrodes is longer than a discharge limit distance.

4. The analyzer according to claim 1, wherein
the outlet of the shielding electrode is located within an ion transmission region between the pair of facing electrodes of the ion mobility separation part.

5. The analyzer according to claim 1, wherein
at least an inner surface of the ion flow path of the shielding electrode has conductivity.

6. The analyzer according to claim 1, wherein
the ion flow path is formed such that the bent portion is recessed in a concave shape.

7. The analyzer according to claim 1, wherein
a mass spectrometer is connected to a succeeding stage of the ion mobility separation part.

8. The analyzer according to claim 7, wherein
the mass spectrometer includes a first pore electrode facing the ion mobility separation part to keep an interior of the mass spectrometer in a vacuum state, and
a conductance of the shielding electrode is larger than that of the first pore electrode.

9. The analyzer according to claim 1, wherein
the ion flow path includes a second outlet at a position where the second outlet is able to be seen from the inlet, and
the analyzer further includes a detachable plate member which closes the second outlet.

10. The analyzer according to claim 1, further comprising:
a first ion source and a second ion source as the ion source, wherein
the shielding electrode includes a first inlet corresponding to the first ion source and a second inlet corresponding to the second ion source as the inlet, and
an ion flow path starting from the first inlet and an ion flow path starting from the second inlet join a single flow path ending at the outlet in the middle.

11. The analyzer according to claim 1, wherein
the ion flow path is provided with an electrode at a position where the outlet is able to be seen.

* * * * *